United States Patent [19]

Howard, Jr. et al.

[11] 4,228,263
[45] Oct. 14, 1980

[54] POLYMERIZATION OF PROPYLENE WITH A CATALYST PREPARED IN SITU

[75] Inventors: Edward G. Howard, Jr., Hockessin; Christos Sarafidis, Wilmington, both of Del.

[73] Assignee: E. I. Du Pont de Nemours and Company, Wilmington, Del.

[21] Appl. No.: 917,281

[22] Filed: Jun. 20, 1978

[51] Int. Cl.² .......................... C08F 4/02; C08F 10/06
[52] U.S. Cl. ....................................... 526/154; 526/96; 526/123; 526/130; 526/348; 526/351; 526/903
[58] Field of Search ................. 526/96, 123, 130, 154, 526/903

[56] References Cited

U.S. PATENT DOCUMENTS

| | | | |
|---|---|---|---|
| 3,002,961 | 10/1961 | Kirschner et al. | 526/902 |
| 3,694,422 | 9/1972 | Long | 526/130 |
| 3,794,628 | 2/1974 | Bower | 526/96 |
| 3,840,508 | 10/1974 | Ballard et al. | 526/130 |
| 3,875,132 | 4/1975 | Kruse | 526/96 |
| 3,932,307 | 1/1976 | Setterquist | 526/130 |

FOREIGN PATENT DOCUMENTS

| | | | |
|---|---|---|---|
| 1389767 | 1/1965 | France | 526/902 |
| 909081 | 10/1962 | United Kingdom | 526/902 |

Primary Examiner—Edward J. Smith

[57] ABSTRACT

In the production of elastomeric polypropylene by polymerizing propylene in the presence of a catalyst system which is the reaction product of a metal oxide and and an organometallic compound of Zr, Ti or Hf under conditions such that the reaction medium contains liquid propylene, a fluid, mobile slurry of polypropylene in propylene is formed by mixing the components of the catalyst system together in the presence of the propylene to be polymerized.

10 Claims, No Drawings

POLYMERIZATION OF PROPYLENE WITH A CATALYST PREPARED IN SITU

DESCRIPTION

1. Technical Field

This invention relates to an improved process for polymerizing propylene. More particularly it relates to a process for polymerizing and copolymerizing propylene in the presence of a coordination catalyst system in which the components of the catalyst system are mixed together in the presence of the propylene to be polymerized.

2. Background Art

U.S. Pat. No. 3,932,307 to Setterquist describes the preparation of a reactive coordination-catalyst system for polymerizing olefins. In this preparation tetraneophylzirconium is allowed to react with certain types of partially hydrated alumina or other metal oxides. A typical catalyst preparation is carried out by mixing a suspension of alumina in an inert hydrocarbon with a solution of tetraneophylzirconium in an inert hydrocarbon at 0°–100° C. until the reaction is complete. In the examples this reaction is carried out at temperatures between about room temperature and 50° C. and for times from 3 minutes to 21 hours. The preformed neophylzirconium aluminate on alumina is then brought into contact with one or more olefins and polymerization takes place.

In U.S. Pat. No. 3,950,269 Setterquist describes a variation of the above catalyst in which the preformed neophylzirconium aluminate on alumina is hydrogenated to form a zirconium neophyl hydride aluminate on alumina catalyst which is subsequently used in the polymerization of olefins.

In assignee's copending application Ser. No. 814,878, filed July 12, 1977, now abandoned in the names of John W. Collette and Charles W. Tullock, these types of catalyst systems are used to polymerize propylene to a novel elastomeric polypropylene. In addition to tetraneophylzirconium, other specified types of organometallic derivatives of Group IVa transition metals, i.e., titanium, zirconium, and hafnium, are described as being suitable. The polymerization can be carried out by a solution method, in which the propylene is present as a solution in an inert hydrocarbon such as cyclohexane, or by a slurry method, in which the polymerization medium is essentially excess liquid propylene and only a relatively minor amount of an inert hydrocarbon solvent, from the catalyst suspension, is present. The slurry method is preferred. Hydrogen may be present to control molecular weight.

It has been found that, when using the slurry technique, the particles of polypropylene initially produced tend to agglomerate to form larger masses or, in some cases, a single large mass of polymer. This is not a problem in laboratory preparations, where methods such as precipitation with inert nonsolvents can be used to produce polypropylenes in the form of crumb-like solids that can be readily separated and purified. It is a serious problem, however, in semiworks or plant-scale preparations, particularly in continuous-flow apparatus, where fluidity and mobility of the product slurry are essential for successful operation.

Disclosure of Invention

The present invention is based on the discovery that the process of polymerizing propylene in the presence of a catalyst system which is the reaction product of a metal oxide and an organometallic compound of the formula $(RCH_2)_4M$, where M is Zr, Ti or Hf; R is aryl, aralkyl, tertiary alkyl or trialkylsilyl; the aforementioned alkyl groups are $C_1$ to $C_{12}$; and the $RCH_2$ group has no hydrogen bonded to the carbon which is beta to M; and optionally in the presence of hydrogen, at a temperature of 20° to about 100° C. and a pressure of about 147 psi up to about 5000 psi (1.0–34.5 mega-pascals, MPa) such that the reaction medium contains liquid propylene, can be carried out so as to obtain elastomeric polypropylene as a fluid, mobile slurry in propylene by the improvement which comprises mixing the components of the catalyst system together, whereby they react to form said catalyst system, in the presence of the propylene to be polymerized.

The greatest improvement in polypropylene slurry properties is realized for polymerizations carried out in the presence of hydrogen. Large masses of polymer are formed by the process of Ser. No. 814,878 in the presence of hydrogen even at inherent viscosities as high as 8. When the inherent viscosity is in the preferred range of not more than 6 the problem becomes even more serious. In accordance with this invention good slurries are obtained in the most preferred inherent viscosity range of 4.5 to 6. Polypropylene slurries made by the method of Ser. No. 814,878 in the absence of hydrogen have some degree of stability, and thus a less dramatic improvement in their properties is realized by the process of the present invention. Although the stability of polypropylene slurries prepared in accordance with this invention is lower when the inherent viscosity of the polymer is below about 4.5, there is still a significant improvement as compared with slurries made by the method of Ser. No. 814,878.

The in situ formation of catalyst of the present invention generally provides two additional advantages both in the presence and absence of hydrogen. First, in many cases the process of this invention produces elastomeric polypropylenes at a modestly, but significantly, higher rate than do the processes of U.S. Pat. Nos. 3,932,307 and 3,950,269, and Ser. No. 814,878. Second, it eliminates the need for an inert liquid to suspend the catalyst, and therefore the cost of such liquid and associated problems of recovery and recycle. Operation without such a liquid is illustrated in Example 4 wherein the only liquid other than propylene present is the small amount of toluene used to dissolve the tetraneophylzirconium. This too can probably be eliminated, since it has been found that tetraneophylzirconium is soluble in liquid propylene at concentrations up to at least 0.05 M.

In accordance with this invention the catalyst is prepared in situ in the presence of liquid propylene. Suitable catalysts are the reaction products of an organometallic compound and a partially hydrated metal oxide such as $Al_2O_3$, $TiO_2$, $SiO_2$, and MgO or physical mixtures thereof. Suitable organometallic compounds are those of the formula $(RCH_2)_4M$, where M is Ti, Zr or Hf; R is aryl, aralkyl, tertiary alkyl, (e.g., trialkylmethyl), or trialkylsilyl; and the $RCH_2$ group has no hydrogen bonded to the carbon which is beta to M. The aforementioned alkyl groups can contain from 1–12 carbon atoms.

Typically, the two catalyst components are reacted in the ratio of about 0.01 to about 1.0 millimole of the organometallic compound per gram of metal oxide. The preferred catalysts are those resulting from the reaction of organozirconium compounds (RCH$_2$)$_4$Zr, especially tetraneophylzirconium, with hydroxylated alumina (Al$_2$O$_3$) in the ratio of about 0.1 to about 1.0 millimole of organozirconium compound per gram of alumina. Preferably, the hydroxylated alumina is prepared by allowing fumed alumina to equilibrate with, and thereby adsorb, atmospheric moisture followed by heating at about 120° to about 500° C. for about 1 minute to about 10 hours in a stream of nitrogen. Suitable catalysts also include the reaction product of other organometallic compounds as described above with the aforementioned metal oxides in the same manner. Additional representative examples of organometallic compounds include tetraneopentylzirconium, tetrabenzyltitanium, tetrabenzylzirconium, tetraneopentylhafnium, tetrabenzylhafnium, tetrakis(trimethylsilylmethyl)zirconium, tetraneophyltitanium and tetraneopentyltitanium.

In the polymerization process, one of the catalyst components is brought into contact with propylene in liquid form. The other catalyst component is then added to the mixture. The process can also be carried out by adding each catalyst component separately, but simultaneously, to the liquid propylene reaction medium. The polymerization reaction involves the formation of a slurry of polypropylene in liquid monomer. Normally the catalyst is present in the amount of about 1 gram-atom of zirconium, hafnium or titanium in the catalyst per 200,000–2,000,000 grams of propylene.

The reaction can be carried out at a pressure of about 147 psi (1.0 MPa) up to about 5000 psi (34.5 MPa). Preferably the pressure is less than about 1000 psi (6.9 MPa). Both batch and continuous polymerization can be employed. The usual batch reaction time is about 10 minutes to about 1 hour. Reaction temperatures range from about 20° C. to about 100° C., preferably about 40° C. to about 90° C.

It is preferred that the inherent viscosity of the elastomeric polypropylene be controlled so that it does not exceed about 6. The presence of hydrogen in the reaction medium reduces the inherent viscosity of the polypropylene. Thus, when using a neophylzirconium aluminate on alumina catalyst at 50° C., a partial pressure of hydrogen of about 10 to about 40 psi (0.07–0.28 MPa) may be used. One skilled in the art can readily determine the amount of hydrogen required to provide any desired inherent viscosity.

The inherent viscosity of the polypropylene can also be controlled to some extent by the reaction temperature. As the reaction temperature increases above about 50° C., for example, in the range of about 60° C. to about 90° C., the inherent viscosity will decrease.

After the excess propylene has been vented, the polypropylene can be isolated by conventional methods. Hot-milling, extrusion, or steam-stripping can be used to remove any remaining unreacted propylene and any volatile solvent that was used to introduce the catalyst components. The resulting polypropylene preferably has an inherent viscosity of about 1 to about 6. In many cases the inherent viscosity is actually reduced during isolation.

The process of this invention produces polypropylene in good yield, particularly when neophylzirconium aluminate-on-alumina catalysts are used. Yields range from about 30,000 to about 1,000,000 grams of polymer per gram-atom of zirconium, and are usually at least about 200,000 grams of polymer per gram-atom of zirconium.

Some of the propylene used in accordance with this invention can be replaced with up to 5 mole percent of another α-olefin. Such α-olefins can be incorporated into the polymer by copolymerization without affecting the process of this invention. Representative of such α-olefins are ethylene, 1-butene, 1-pentene, and 1-hexene. The preferred comonomer is ethylene when a comonomer is present.

Inherent viscosity, as referred to herein, is determined as follows:

At 25° C., 0.0275 g of the polypropylene sample is placed in 50 ml of decahydronaphthalene containing 0.1 g/l of butylated hydroxytoluene (2,6-di-t-butyl-4-methylphenol) to give a weight-volume concentration of 0.05% at 135° C., at which temperature the sample is dissolved under nitrogen as it is stirred with a magnetic stirrer for two hours. The solution is poured through a filter stick into a Cannon-Ubbelohde viscometer in which its efflux time is measured at 135° C. in comparison with that of the solvent alone.

$$\text{Viscosity } (\eta_{inh}) = \frac{\ln \frac{T}{T_o}}{C}$$

$T$ = efflux time of solution
$T_o$ = efflux time of solvent
$C$ = concentration (.05 gram per deciliter)

Best Mode

The following examples illustrate the best mode contemplated for carrying out the process of the invention.

Care was taken in each example to exclude oxygen and water from the polymerization and from all steps preceding it. All materials used were of high purity. Metal oxide slurries were made up under nitrogen, and all transfers were carried out under nitrogen.

EXAMPLE 1

The polymerization vessel was a 2-liter stainless steel reactor with a glass window to allow observation of the reaction mixture. It was equipped with a stirrer, two catalyst-addition tubes for injecting the catalyst components, two gas-inlet ports for introducing propylene and hydrogen, and one outlet for evaporation/distillation of volatile materials after termination of the polymerization.

The alumina was activated, fumed Degussa alumina having an active surface of 107 m$^2$/g and containing 0.18% Cl. A secondary treatment was performed by allowing this alumina to equilibrate in the humid atmosphere of the laboratory and then heating it at about 350° C. for 40 minutes in a stream of dry nitrogen.

A. The reactor was purged with nitrogen and then with propylene, sealed, and charged with 1000 ml of propylene. Stirring was started, and the system was heated to 43.5° C. and pressured with hydrogen to 30 psi (0.21 MPa) above the pressure of the propylene. Five milliliters of a 0.1 M solution of tetraneophylzirconium in hexane and an additional 10 ml of hexane was then injected at 45° C. Six minutes later, at 46° C., injection of a suspension of 2 g of alumina in 30 ml of hexane from a syringe was begun. The syringe jammed before the addition was complete; about 1.55 g of alumina was actually added. An exothermic reaction took place immediately, with the temperature rising to 52.5° C. in one minute and to 54° C. in another minute. The polymerization was continued at 44°–54° C. for 10 minutes after the start of the alumina addition. A fluid slurry containing small polypropylene particles formed within 8 minutes. The polymerization was stopped by admitting air to the system, and the reactor was vented. After evaporation and distillation of volatile material, 86 g of elastomeric polypropylene having an inherent viscosity of 4.90 was obtained.

B. For comparison, the following experiment was carried out using the same apparatus and materials as in A above.

The catalyst was prepared in a separate vessel by stirring together 5 ml of 0.1 M tetraneophylzirconium in hexane and a suspension of 2 g of alumina in 34 ml of hexane for one hour, and allowing the mixture to stand for two hours at room temperature.

The reactor was purged with nitrogen and then with propylene, sealed, and charged with 1000 ml or propylene. Stirring was started, and the system was heated to 44.5° C. and pressured with hydrogen to 20 psi (0.14 MPa) above the pressure of the propylene. The catalyst suspension was added at 45° C., and within one minute, in spite of cooling, the temperature rose to 58° C. because of the exothermic polymerization. By this time a very thick slurry of polypropylene had formed. Stirring was continued for 9 minutes at 58°-49° C. Four minutes after the addition of the catalyst, the polymer had agglomerated to the point where effective stirring was impossible. After 10 minutes, at 51° C., another 20 psi (0.14 MPa) of hydrogen was introduced, and the polymerization was continued at 43°-51° C. for another 10 minutes, or a total of 20 minutes. After 14 minutes the polymer had become essentially a single large mass. Air was injected to stop the polymerization, and the reactor was vented. After evaporation and distillation of volatile materials, there was obtained 260 g of elastomeric polypropylene having an inherent viscosity of 8.19.

EXAMPLE 2

This example was carried out using the same apparatus and materials used in Example 1.

The reactor was purged with nitrogen and then with propylene, sealed, and charged with 1000 ml of propylene. Stirring was started, and the system was heated to 43° C. and pressured with hydrogen to 30 psi (0.21 MPa) above the pressure of the propylene. Five milliliters of a 0.1 M solution of tetraneophylzirconium in hexane and an additional 5 ml of hexane was then injected at 45° C. Three minutes later, at 46° C., injection of a suspension of 2 g of alumina in 30 ml of hexane plus an additional 5 ml of hexane was begun. About 25 ml of this dispersion was actually injected, corresponding to the addition of about 1.4 g of alumina. The exothermic polymerization, which started immediately, caused the temperature to rise to 52° C. one minute after the injection of alumina was begun. At this point the reaction mixture was a fluid slurry. The polymerization was continued at 47°-52° C. for 10 minutes after the start of the addition of alumina. After 8 minutes the polymer had agglomerated some, but not to the extent it did in comparative Example 1B. The run was stopped by injection of air, and the product was worked up as in Example 1, to give 89.7 g of elastomeric polypropylene having an inherent viscosity of 4.40. The greater degree of agglomeration compared with that observed in Example 1A is believed to be associated with the lower molecular weight of the polypropylene in the present example.

EXAMPLE 3

This example does not involve the use of hydrogen.

The polymerization vessel was a 5-gal (18.9 liters) stainless steel autoclave equipped with a stirrer and means for charging reactants.

The alumina was similar to the alumina of Example 1, but from a different batch. After exposure to atmospheric conditions it had been dried for 18 hours at 400° C. in a stream of nitrogen.

A. The autoclave was charged with a suspension of 8 g of alumina and 300 ml of cyclohexane. The autoclave was closed, cooled, and charged with 3300 g of propylene. The system was heated to 50° C. with stirring, at which temperature 30 ml of a 0.1 M solution of tetraneophylzirconium in toluene was injected. The polymerization was conducted for 1 hour. During this time a thermocouple near the top of the autoclave recorded temperatures of 50°-55° C., while a second thermocouple near the bottom of the autoclave recorded temperatures of 50°-115° C. After 1 hour the polymerization was stopped by venting the autoclave, and the solid product was separated and air-dried. It was 1260 g of elastic polypropylene, consisting mostly of large pieces that were easily broken up.

B. For comparison the following experiment was carried out to show the activity of a preformed catalyst system.

To a suspension of 8 g of alumina (dried at 400° C. in a stream of nitrogen for 18 hours) in 300 ml of cyclohexane was added 20 ml of a 0.1 M solution of tetraneophylzirconium in toluene. The mixture was stirred thoroughly at room temperature to allow the alumina and tetraneophylzirconium to react; these materials were in contact for 30-60 minutes before coming in contact with propylene. The catalyst suspension was charged to the reactor of Example 3A, which was then closed, cooled to about −20° C., and charged with 3300 g of propylene over a period of 10-15 minutes. The system was heated to 50° C. over a 6-minute period with stirring and then held at 50°-54° C. at autogenous pressure for 1 hour. The 50°-54° C. temperature was recorded on the regular thermocouple near the top of the reactor; a second thermocouple near the bottom recorded temperatures of 50°-75° C. during this time. At the end of the 1-hour period the polymerization was stopped by venting the reactor, and the solid product was separated and air-dried. It weighed 1150 g and consisted of large, fairly tough lumps of elastic polypropylene which were not easily broken.

C. To determine how much polypropylene was formed in comparative experiment B before the temperature of the system reached 50° C., the first part of experiment B was repeated. As soon as the temperature reached 50° C., the polymerization was stopped by venting the autoclave, and the solid product was separated and air-dried. It weighed 184.4 g. The difference between this weight and the 1150 g of product obtained in experiment B, or about 966 g, represents the amount of polypropylene formed in 1 hour at 50°-54° C. in experiment B. This amount is 23% less than the 1260 g of polypropylene formed during the 1 hour at 50°-55° C. in Example 3A.

EXAMPLE 4

This example shows operation without the use of an inert liquid.

The procedure of Example 3A was essentially repeated, except that no cyclohexane was added to the autoclave. During the 1-hour polymerization period the thermocouple near the top of the autoclave recorded temperatures of 51°–55° C., while the thermocouple near the bottom recorded temperatures of 50°–57° C. The product was 1150 g of elastic polypropylene in the form of small particles and agglomerates of small particles that could be easily broken up.

EXAMPLE 5

The apparatus was the same as in Example 1. The ethylene used in this example contained 6 ppm of oxygen and less than 2 ppm of water.

The reactor was purged with nitrogen and then with propylene, sealed, and charged with 1000 ml of propylene. Stirring was started, and the system was pressured with ethylene to 30 psi (0.21 MPa) above the pressure of the propylene, and then with hydrogen to an additional 30 psi (0.21 MPa) above the pressure of the propylene and ethylene. The mixture was heated to 42° C., and 10 ml of a 0.05 M solution of tetrabenzylzirconium in toluene-hexane was injected. Two minutes later, at 41° C., a suspension of 2 g of alumina in 40 ml of hexane was injected. An exothermic polymerization, which started immediately, caused the temperature to rise to 44.5° C. in one minute. A fluid slurry was formed as the polymerization proceeded, and persisted throughout the run. Polymerization was continued for 20 minutes after the injection of the alumina suspension. For the last 19 minutes the temperature was 44.5°–46° C. The reaction was stopped by injection of air, stirring was stopped, and the mixture was allowed to stand for five minutes. When stirring was begun again, the slurry was as fluid as before, which behavior confirmed the presence of a stable slurry. The product was worked up as in Example 1, to give 67 g of an elastomeric propylene/ethylene copolymer containing 11.1 weight percent combined ethylene by infrared analysis. Its inherent viscosity was 4.73.

EXAMPLE 6

This example illustrates operating the process of the invention by a continuous method.

The polymerization reactor was a stainless steel vessel with a capacity of about 2.5 liters. It was equipped with a glass window for viewing the reaction mixture, means for charging two catalyst components and propylene, and two turbine impellers for agitation. It was also equipped with an intermittently opening ball valve at the bottom for taking out effluent. The valve was controlled so that the liquid level in the reactor remained approximately constant at about 1 liter.

After the reactor was purged with nitrogen and then with propylene while being heated with steam, it was closed, and liquid propylene was collected in it under autogenous pressure while the liquid temperature was maintained at about 50° C. Liquid collected until its level reached the preset level where the exit system began to operate as described above. Propylene feed was maintained at 1700 g/hr thereafter. Introduction of a suspension of 138 g of alumina, prepared as in Example 1, in 3350 ml of hexane was then begun at 75 ml/hr. Then introduction of a solution of 12.6 g of tetraneophylzirconium in 1000 ml of hexane was begun at 30 ml/hr. The introduction of alumina proved to be uneven; the apparatus was rearranged so that the liquid propylene was led through the line for introduction of the alumina slurry. This gave a satisfactorily steady introduction of the alumina suspension. After the system had been operating as described for about 1.5 hours, the slurry of polypropylene was collected for 1 hour. During this time the reaction temperature was mostly 54°–56° C. After removal of volatile materials and air-drying, the polypropylene collected during this period weighed 141 g.

Industrial Applicability

Example 6 illustrates a continuous process which would be suitable for scaling up in commercial production. The polypropylene prepared in accordance with the process of this invention is elastomeric in character as fully described in application Ser. No. 814,878. It is an excellent general purpose thermoplastic elastomer having properties which make it suitable for use in films (including heat shrinkable films), filaments, fibers, and sheets which have elastomeric properties and for fabric coating applications, wire and cable coatings, hot melt adhesives, and injection molded, compression molded or extruded articles such as tires and tubing.

We claim:

1. In the method of producing elastomeric polymers of propylene and up to about 5 mole % of another α-olefin by the polymerization of propylene in the presence of a catalyst system which is the reaction product of a metal oxide and an organometallic compound of the formula $(RCH_2)_4M$, where M is Zr, Ti or Hf; R is aryl, aralkyl, tertiary alkyl or trialkylsilyl; the aforementioned alkyl groups are $C_1$–$C_{12}$; and the $RCH_2$ group has no hydrogen bonded to the carbon which is beta to M; at a temperature of 20° to 100° C. and a pressure of 147 psi up to 5000 psi (0.1–34.5 MPa) such that the reaction medium contains liquid propylene, the improvement which comprises mixing the components of the catalyst system together, whereby they react to form said catalyst system, in a solvent consisting principally of liquid propylene and the elastomeric polymer is produced as a mobile slurry in said liquid propylene.

2. The method of claim 1 in which the polymerization is carried out at 40° to 90° C. and a pressure of less than 1000 psi (6.9 MPa).

3. The method of claim 1 in which the catalyst system is the reaction product of alumina and tetraneophylzirconium.

4. The method of claim 1 in which the polymerization is carried out in the presence of hydrogen.

5. The method of claim 1 in which the polymerization is carried out at a temperature of 60° to 90° C.

6. The method of claim 1 in which up to 5 mole percent of the propylene monomer is replaced with another α-olefin.

7. The method of claim 6 in which the α-olefin is ethylene.

8. The method of claim 2 in which the catalyst system is the reaction product of alumina and tetraneophylzirconium.

9. The method of claim 8 in which the polymerization is carried out in the presence of hydrogen.

10. The method of claim 9 in which up to 5 mole percent of the propylene monomer is replaced with ethylene.

* * * * *